UNITED STATES PATENT OFFICE.

TAYLOR E. DANIELS, OF DETROIT, MICHIGAN.

IMPROVEMENT IN COMPOUNDS FOR ARTIFICIAL STONE.

Specification forming part of Letters Patent No. 166,265, dated August 3, 1875; application filed July 6, 1875.

*To all whom it may concern:*

Be it known that I, TAYLOR E. DANIELS, of Detroit, in the county of Wayne and State of Michigan, have invented certain Improvements in Artificial Marble, of which the following is a specification:

My invention consists in an artificial marble composed of linseed-oil, white bees-wax, rosin, borax, water, sugar, alum-water, and Kean's or other hydraulic cement.

In preparing my compound I provide the various ingredients in the following proportions: Linseed-oil, one quart; bees-wax, one-half pound; rosin, one pound; borax, one pound; water, ten gallons; sugar, three pounds; alum-water, one gallon; cement, a sufficient quantity.

I first cut the linseed-oil with alcohol, and then melt together the bees-wax, rosin, and borax, and, after bringing the oil to a white heat, add them thereto. I next heat the water to the boiling-point, add the sugar thereto, and then boil for five minutes, after which the ingredients first combined are added to the water, and the entire mass boiled for fifteen minutes, after which the alum-water is added, and the boiling continued half an hour longer. The compound, while hot, is then filtered through charcoal, after which hot water is added until the compound is increased in quantity to about forty gallons, when it is permitted to cool. The cement is then provided in a quantity sufficient for the special occasion, and the fluid added thereto until the mass is reduced to a plastic condition. It is then molded into the required form, and permitted to dry and harden, the drying operation being facilitated, if desired, by the use of a dry kiln or oven.

When it is desired the surface of the molded objects may be hardened and finished by the application of a solution of one gallon of silicate of soda, boiled in ten gallons of water.

The marble may be colored and grained by the application of suitable materials to its surface, or by incorporating them in the mass before or during the operation of molding. One convenient manner of imitating the natural veins in the material is to place strings of the colored material in the mold, and then fill in and around them with the main body of material. Where very delicate lines are desirable the fine threads of colored material are laid upon the surface of paper which is placed in the bottom of the mold to receive the body of material. After the article is hardened and removed from the mold the paper is moistened and drawn off, leaving the fine colored threads in the surface of the molded object.

Having described my invention, what I claim is—

A composition for artificial stone consisting of bees-wax, borax, rosin, alum, sugar, linseed-oil, cement, and water, in substantially the proportions specified, with or without the application of silicate of soda.

TAYLOR E. DANIELS.

Witnesses:
CHARLES S. BARRY,
CHARLES C. TOWLE.